United States Patent [19]

Gebara

[11] Patent Number: 5,691,870
[45] Date of Patent: Nov. 25, 1997

[54] CIRCUIT FOR MONITORING AND DISABLING POWER SUPPLY SIGNALS TO A MICROPROCESSOR IN A COMPUTER SYSTEM UTILIZING SECONDARY VOLTAGE REGULATORS

[75] Inventor: Ghassan R. Gebara, Spring, Tex.

[73] Assignee: Compaq Computer Corporation, Houston, Tex.

[21] Appl. No.: 551,787

[22] Filed: Nov. 7, 1995

[51] Int. Cl.$^6$ ............................................. H02H 3/18
[52] U.S. Cl. ........................... 361/86; 307/87; 323/276
[58] Field of Search ............................. 361/18, 86, 88; 307/45, 85–87; 323/274–276

[56] References Cited

U.S. PATENT DOCUMENTS 4,827,149  5/1989  Yabe .................................... 307/64
5,173,832  12/1992  Giorgetta et al. ..................... 361/88

OTHER PUBLICATIONS

Intel® Pentium® Pro Family Developer's Manual vol. 1: Specification, p. 11–7 to 11–8, Jan. 1996.

*Primary Examiner*—Jeffrey A. Gaffin
*Assistant Examiner*—Michael J. Sherry
*Attorney, Agent, or Firm*—Pravel, Hewitt, Kimball & Kreiger

[57] ABSTRACT

A circuit that monitors and disables power supply signals to a microprocessor in a computer system utilizing a main power supply and secondary voltage regulators. The circuit detects whether the voltages supplied by the secondary voltage regulators to the microprocessor fall within a predetermined range that is governed by microprocessor requirements. If a supply voltage falls outside its specified range, the circuit turns on a metal-oxide-silicon field effect transistor (MOSFET) connected between one of the main power supply voltages and ground, effectively shorting the primary supply voltage to ground. This activates fault detection circuitry internal to the main power supply, causing the main power supply to shut down, thereby removing all power supply voltages to the microprocessor.

24 Claims, 7 Drawing Sheets

FIG. 2A

CIRCUIT FOR MONITORING AND DISABLING POWER SUPPLY SIGNALS TO A MICROPROCESSOR IN A COMPUTER SYSTEM UTILIZING SECONDARY VOLTAGE REGULATORS

FIELD OF THE INVENTION

The invention relates to the power supply circuitry in a computer system and more specifically to the generation of fault detection signals for secondary supply voltages in a system utilizing multiple supply voltage levels derived from a main power supply, the fault detection signals being employed to disable the power supply.

BACKGROUND OF THE INVENTION

In the 1960's, when transistor-transistor logic (TTL) became the prevalent logic family, a 5V supply was chosen in order to provide adequate noise immunity. The totem-pole output configuration of TTL produces a typical 3V logic high output level, providing a 0.6V margin above the typical V$_{OH}$ threshold of 2.4V. The advent of complementary metal-oxide-silicon (CMOS) logic, however, brought a configuration having an output voltage capable of reaching the level present on the supply rail. Despite this, the supply rail remained at 5V for many years in order to maintain TTL-to-CMOS logic compatibility. Today, a 5V rail is considered unnecessary and even undesirable in many respects. For example, with a CMOS output voltage capable of reaching the level present on the supply rail, a 3V supply in an all-CMOS circuit provides the same noise margins as TTL.

Lowering the supply voltage also provides two benefits that are becoming increasingly important to designers of today's faster, more powerful microprocessors. First, decreasing the supply voltage can result in a substantial power savings. Such power savings coupled with an emphasis on low-power portable computer design spurred a 1990's move from a 5V to a 3.3V standard.

Additionally, a lower voltage supply rail is important to vendors who have used ever-shrinking device geometries in order to integrate more functions and higher speed into CPUs and other products. As device geometries entered the deep sub-micron range, reliability problems such as gate-oxide breakdown and hot electron effects were exacerbated by a 5V supply rail. Reducing the supply rail to ~3V aided in reducing the failure mechanisms to acceptable levels.

The move to lower supply voltages, however, has not been without problems. Microprocessor board designers and manufacturers are often faced with systems requiring a wide range of supply voltage levels. While many microprocessors and related chip sets are available in 3V versions, other peripherals, such as some PCMCIA controllers, expansion slots, and floppy- and hard-disk-drive controllers may still require a 5V supply.

Additionally, some recently announced microprocessors such as the P6 from Intel Corporation may require up to four different voltage levels. Other device manufacturers may use several supply voltages that depend on the particular chip fabrication process being used. Due to manufacturing process variations, the specific voltage levels required by a particular type of chip may also vary from production run to production run.

So far as is known, manufacturers of the power supplies used in computer systems have not satisfactorily addressed problems arising from multiple and nonstandard power supply voltage requirements. The power supplies used in most distributed power computer systems provide standard 3.3-, 5- and 12-Vdc outputs. The other voltages required by some recent microprocessors must be generated from these power supply signals, so a secondary voltage regulator module with DC—DC converter integrated circuits (ICs) is typically located between the power supply and the microprocessor. Power supplies detect a fault in the signals that they directly provide (i.e. a short between any of the 3.3-, 5-, 12Vdc and ground) and shut off the power. However, power supplies are not capable of detecting faults in the signals generated by the voltage regulator module.

Failure to detect a fault to a voltage supply pin can have dire consequences for a microprocessor, especially when voltages provided by the secondary voltage regulator module fail while voltages provided by the main power supply remain constant. Excessive exposure to this condition can compromise long-term processor reliability and lead to latch-up conditions.

SUMMARY OF THE INVENTION

A computer system constructed according to the present invention includes a voltage regulator and fault detection module located between a main power supply and the power supply pins of a microprocessor or other device. The voltage regulator circuitry, including DC—DC converter(s), uses standard voltage outputs from the power supply (usually 3.3V, 5V, 12V and ground) to generate non-standard secondary supply voltages required by modern chips.

The voltage regulator and fault detection module in the disclosed embodiment incorporates two DC—DC converter ICs, each with support circuitry including a low pass filter and an adjustable feedback network for modifying the output voltage. The adjustable feedback networks allow supply voltage levels to be adjusted as required to achieve non-standard levels necessitated by particularities in the chip fabrication process.

In the event of a fault on one of the secondary voltage signals, all supply voltages provided by the voltage regulator module are turned off in order to protect the microprocessor circuitry from potentially destructive latch-up conditions. According to the present invention, the outputs of the voltage regulator circuitry are monitored by fault detection circuitry. The fault detection circuitry preferably utilizes an adjustable window comparator configuration to detect over-voltage or under-voltage conditions. In the event that an over-voltage fault is detected, electronic switches are used to short-circuit ("crowbar") the outputs of the power supply to ground.

Shorting any one of the power supply lines to ground activates the power supply's own fault circuitry. The power supply then shuts itself down, as do all supply voltages generated by the voltage regulator module. In this manner, the microprocessor is protected from latch-up problems.

The present invention thus provides voltage fault detection circuitry for the secondary voltage regulator module in a multiple-supply computer system. It also disables the main power supply when fault conditions are detected. The voltage fault detection circuitry is also desirable as a secondary check on the power supply's own protection circuitry.

BRIEF DESCRIPTION OF THE DRAWINGS

A better understanding of the present invention can be obtained when the following detailed description of the preferred embodiment is considered in conjunction with the following drawings, among which.

DETAILED DESCRIPTION OF PREFERRED EMBODIMENT

Figure 1:
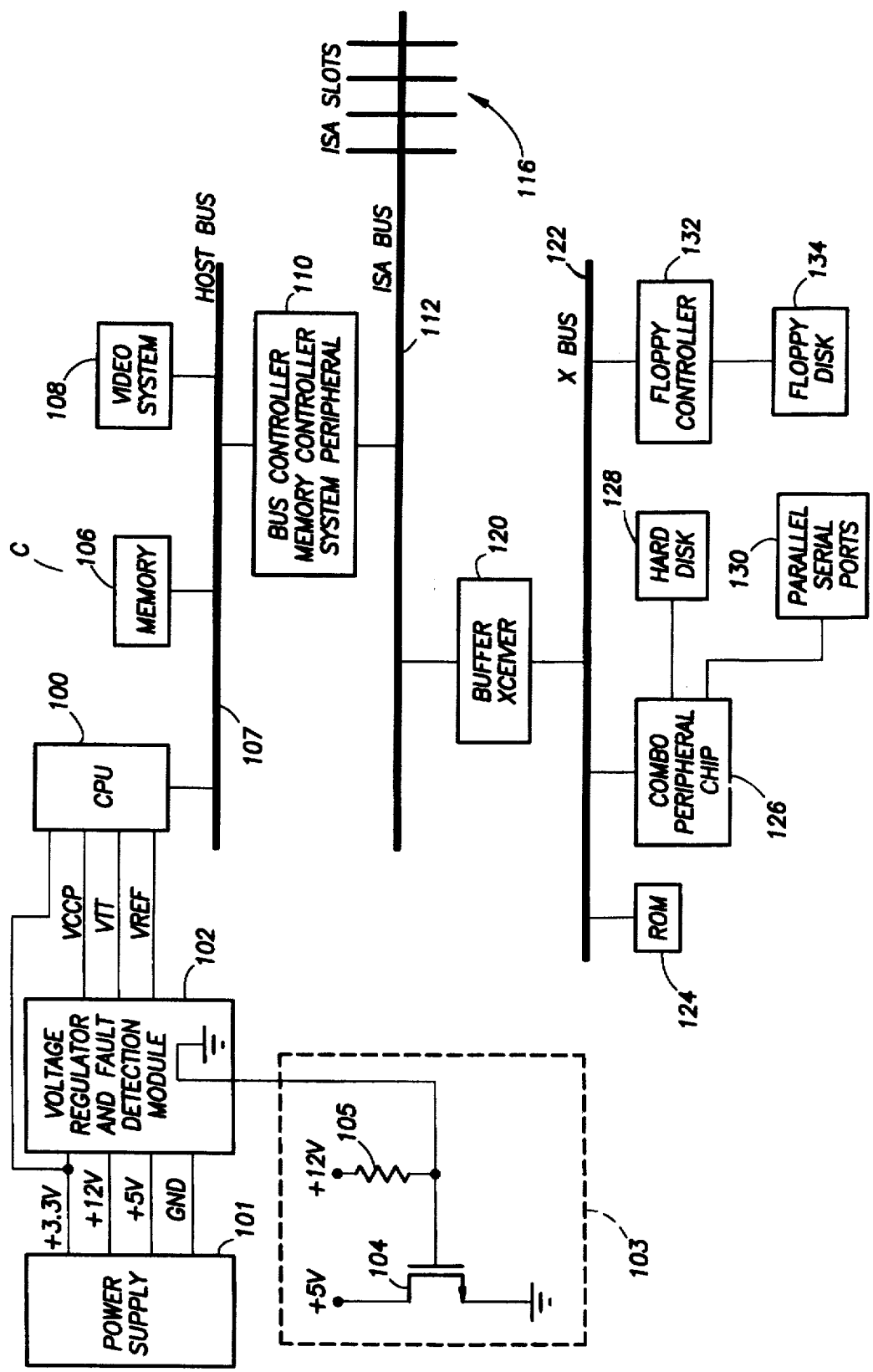
FIG. 1 is a schematic diagram of an exemplary computer system incorporating the power supply voltage regulator and fault detection module according to the present invention.

Referring now to FIG. 1, an exemplary computer system C incorporating the power supply voltage regulation and fault detection circuitry according to the present invention is shown. The computer system C includes a host CPU or processor 100, which in the preferred embodiment is a P6 microprocessor from Intel Corporation. It is contemplated that microprocessors from other manufacturers requiring non-standard or variable supply voltages could, however, be substituted. The computer system C is generally represented in FIG. 1 as one having components according generally to industry standard architecture, or ISA. The specific bussing schemes and support circuitry that are used, of course, may vary depending on the particular type of microprocessor 100 employed.

A main power supply circuit 101 is also part of the computer system C. The outputs provided by the power supply circuit 101 include a 12-volt primary supply signal +12V, a 5-volt primary supply signal +5V, a 3.3-volt primary supply signal +3.3V, and a ground signal GND. In the disclosed embodiment, all of the primary supply signals are provided to a voltage regulator and fault detection module 102. In addition, the +3.3V signal is provided directly to one of the power supply pins of the CPU 100. In the case of the P6 processor, this signal is provided to a secondary power supply pin VCCS, which is used by some versions of the second level cache. In the disclosed embodiment, the voltage regulator and fault detection module 102 provides three secondary supply voltage signals to the CPU 100: VCCP, VTT, and VREF. Again using the P6 as an example CPU 100, VCCP is the primary supply voltage, VTT powers all Gunning Transceiver Logic (GTL+) termination resistors, and VREF sets up the reference voltage pins for the GTL+ buffers on the P6. It is contemplated that the output signals of the voltage regulator and fault detection module 102 can be adjusted to account for variations in the manufacture of the CPU 100.

Computer system C also includes a board-level fault circuit 103. Included within fault circuit 103 is a metal-oxide-semiconductor field effect transistor (MOSFET) 104, whose drain is connected to the 5-volt supply signal +5V and whose source is connected to ground GND. It is contemplated that the drain of MOSFET 104 could be connected to other of the main supply signals.

A pull-up resistor 105 is connected between the gate of the MOSFET 104 and the 12-volt supply signal +12V available from power supply 101, although other supply signals could be used. The gate of the MOSFET 104 is also connected to a ground plane internal to the voltage regulator and detection module 102. In this manner, if the module 102 is removed, the pull-up resistor 105 causes the gate of MOSFET 104 to pull up to +12V, thereby turning on the MOSFET 104 and causing the 5-volt supply signal +5V to short to ground GND. This in turn activates the conventional internal fault circuitry of power supply 101, and thus causes the power supply 101 to shut itself down.

A host bus 107 is connected to the CPU 100 to act as a first bus in the computer system C. A main memory system 106 is also connected to the host bus 107 to act as the main memory of the computer system C. A video system 108 is further connected to the host bus 107 to allow for a high performance video system.

A controller 110 is connected in a conventional manner between the host bus 107 and an ISA bus 112. The controller 110 includes a bus controller portion, a memory controller portion and a system peripheral control portion. The system peripheral control portion includes certain common peripheral devices used in the computer system C such as timers, an interrupt controller, and a DMA controller. The bus controller portion of the controller 110 controls bus cycles on the host bus 102 and the ISA bus 112. The memory controller portion provides appropriate signals to the memory 106, which preferably is made up of dynamic random access memories (DRAMs). A number of ISA slots 116 for receiving interchangeable circuit cards are present on the ISA bus 112.

Appropriate buffer and transceiver logic 120 is connected between the ISA bus 112 and an X bus 122, which forms an additional input/output (I/O) bus in the computer system C. A read-only memory or ROM 124, which contains the instructions forming the BIOS and other fundamental operations, is connected to the X bus 122.

A combo peripheral IC or chip 126 is also connected to the X bus 122. The combo peripheral IC 126 includes a keyboard controller to receive keyboard and pointing device inputs from a user, an interface for connection to parallel and serial ports 130 to provide for certain I/O capabilities, and a hard disk controller for interfacing to a hard disk drive 128. The combo peripheral IC 126 also includes a real-time clock (RTC) and basic and extended CMOS memory. The RTC provides various real-time clock functions, and the CMOS memory provides storage for various system configuration information. Additionally, a floppy disk controller 132 is connected to the X bus 122. The floppy disk controller 132 acts as an interface between the X bus 122 and a floppy disk drive 134.

Figure 2A:
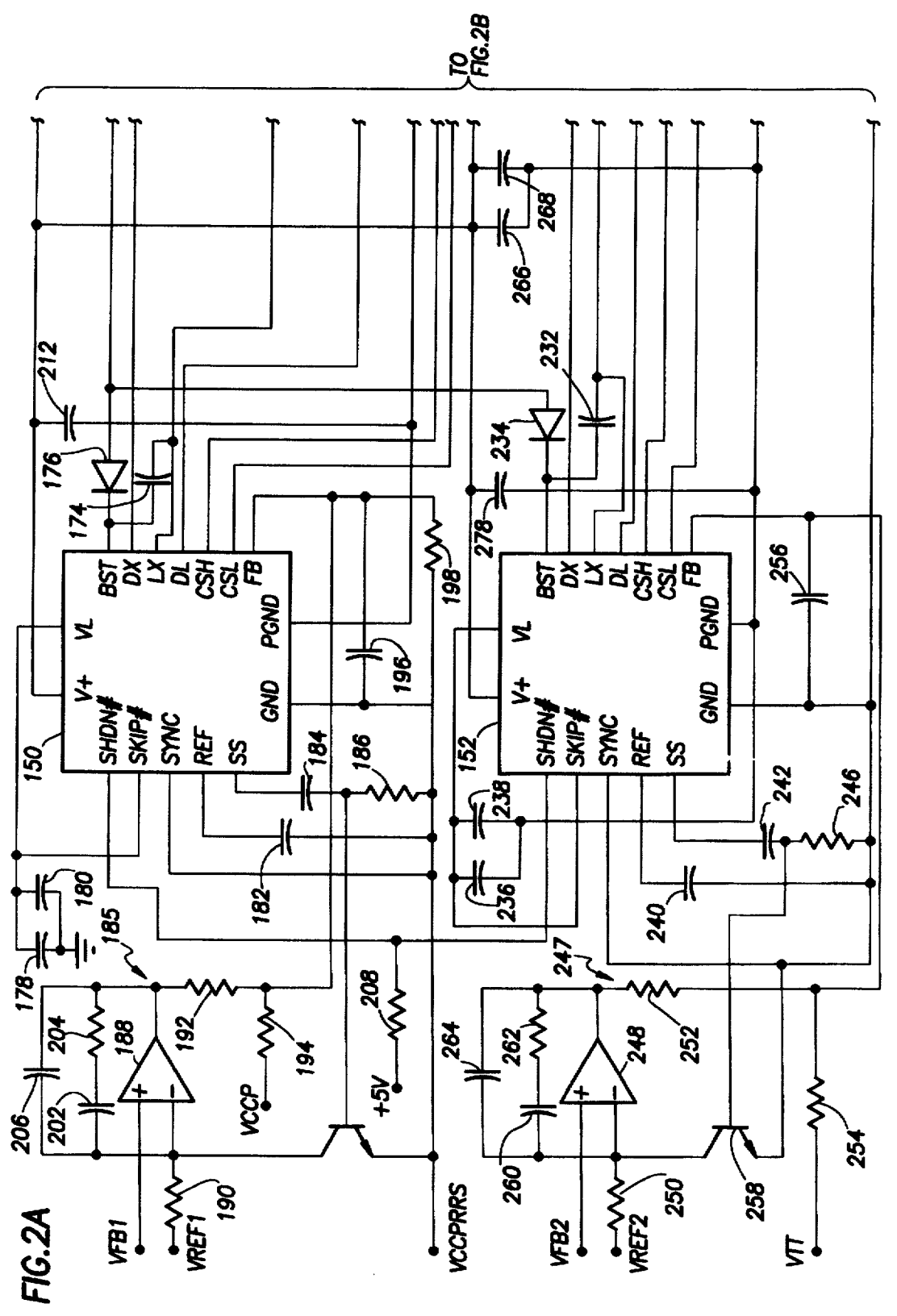
Figure 2B:
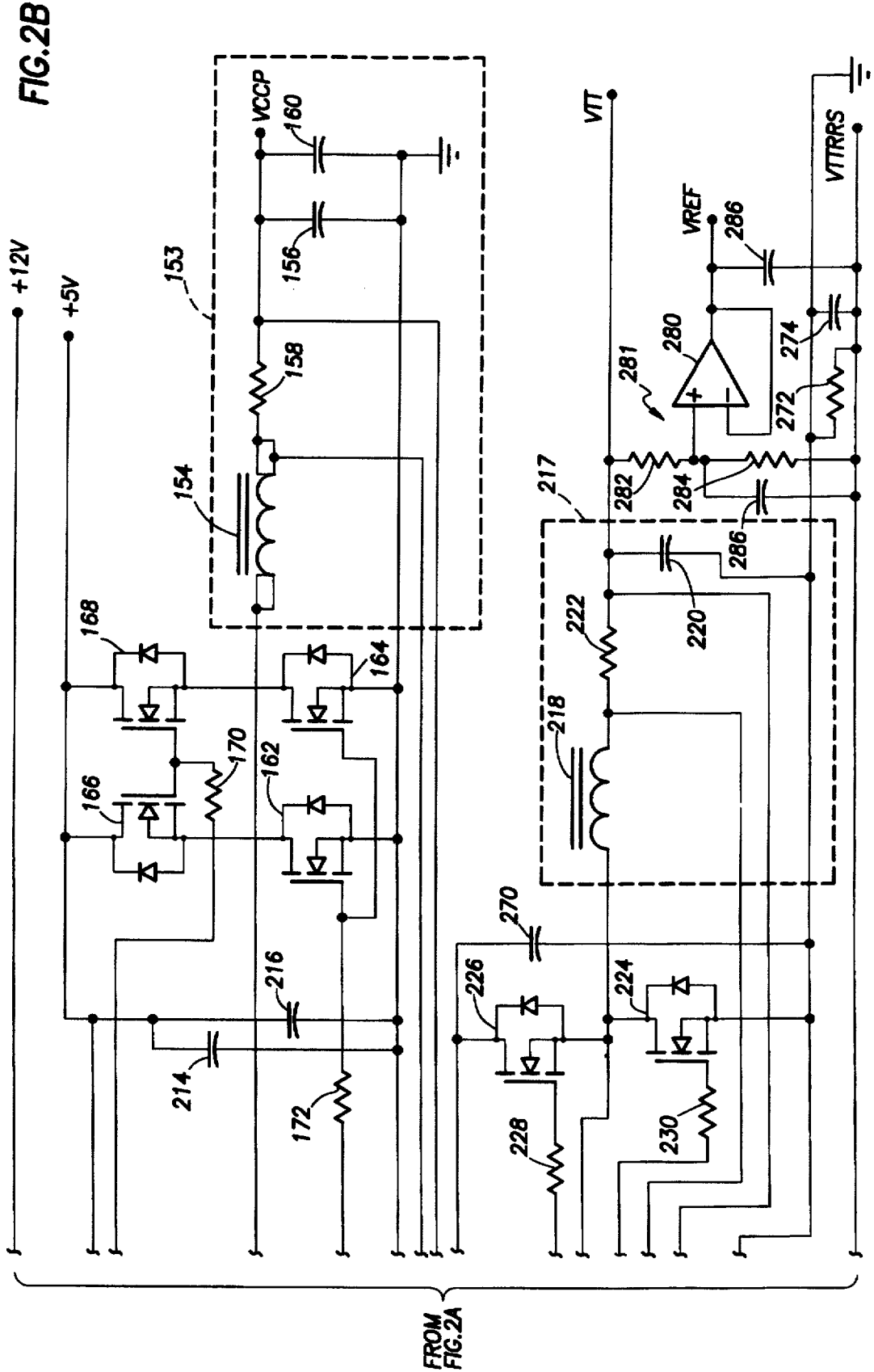
FIG. 2 is a schematic diagram of the DC—DC converter ICs and support circuitry incorporated in the voltage regulator and fault detection module of FIG. 1.

Referring now to FIG. 2, details of the voltage regulator circuitry portions of the module 102 are shown for generating the voltages VCCP, VTT, and VREF described above. Two conventional DC—DC converter ICs 150 and 152 are included, which may be any of the several types generally available, though the MAX797 by Maxim Corporation is preferred.

I. CIRCUITRY FOR GENERATING VCCP

As has been set forth, VCCP is the primary supply voltage for CPU 100. Converter 150 forms and provides voltage VCCP at the output of a low pass filter 153, which is provided to diminish output voltage fluctuations. The low pass filter 153 includes an inductor 154 connected between a switching node connection LX of the converter 150 and a current sense resistor 158. An output filter capacitor 156 is connected between the other side of current sense resistor 158 and ground. A decoupling capacitor 160 is also connected between the VCCP output and ground GND to remove high frequency noise.

Two MOSFETs 162 and 164 are connected in parallel between converter 150 and the inductor 154 to serve as synchronous rectifiers. The gates of MOSFETs 162 and 164 are connected to the low-side gate drive output DL of the converter 150 through a low ohmage resistor 172. The source terminals of the low-side MOSFETs 162 and 164 are both connected to ground, while the drain terminals are connected to the switching node connection of the converter 150.

Also connected to switching node connection of converter 150 are the source terminals of a pair of parallel connected high-side MOSFETs 166 and 168. The gates of the high-side MOSFETs 166 and 168 are driven by the high-side gate-drive output DH of the converter 150 through a low ohmage resistor 170. The drain terminals of the high-side MOSFETs 166 and 168 are connected to the +5V power supply of circuit 101.

The MOSFETs 162, 164, 166, and 168 function as a power switching circuit and are used to regulate peak current in inductor 154 as a function of an output voltage error signal across the current sense resistor 158. One side of the resistor 158 is connected to a high-side current-sense input CSH of the converter 150 while the other side is connected to a low-side current-sense input CSL. Whenever the voltage difference between the CSH and CSL inputs of the converter 150 exceeds about 100 mV, an internal current-limit circuit in the converter 150 resets an internal main pulse width modulator (PWM) latch and turns off the high-side MOSFET drivers.

A capacitor 174 is connected between the switching node connection LX and boost capacitor connection BST of converter 150. In addition, a diode 176 is connected between the +5V power supply and boost capacitor connection. Together, the capacitor 174 and diode 176 form a flying capacitor boost circuit that is used to supply the gate drive voltage for the high-side MOSFETs 166 and 168. During the time in which the low-side MOSFETs 162 and 164 are on, the capacitor 174 is charged to +5V through the diode 176. The converter 150 then turns on the high-side MOSFETs 166 and 168 by closing an internal switch between the boost capacitor and high-side gate-drive connections. The voltage across the capacitor 174 provides the necessary enhancement voltage to turn on the high-side MOSFETs 166 and 168.

In the preferred mode of operation, the 5 volt internal linear-regulator output signal VL, as well as the pulse-skipping mode input SKIP* of the converter 150 are coupled to ground via bypass capacitors 178 and 180, which are configured in parallel. SKIP* can be set high to enable a low noise operation mode for converter 150. The reference voltage output REF of the converter 150 is also bypassed to ground via a capacitor 182.

A capacitor 184 is connected to the soft-start timing capacitor connection SS of the converter 150. A resistor 186 connects the other side of the capacitor 184 to ground. The capacitor 184 allows for a gradual increase of the internal current-limit level at the start-up of converter 150 to reduce input surge currents. It also causes the voltage seen across the output capacitor 156 to charge up relatively slowly depending on the impedance value of capacitor 184.

Connected to the feedback pin FB of the converter 150 is a feedback circuit 185 used to adjust the supply voltage VCCP between about 2.1 volts and 3.5 volts. The circuitry 185 includes a low power operational amplifier (OP AMP) 188, which is preferably a LM324MX from National Semiconductor. The inverting input of the OP AMP 188 is connected to a voltage level VREF1, provided through a resistor 190, while the non-inverting input of OP AMP 188 is connected to an adjustable voltage level VFB1. The voltage level VREF1 is established by a shunt voltage reference 490 (FIG. 5) and is approximately 1.25 volts. The voltage level of VFB1 is set in a manner set forth below by a voltage fault threshold adjustment network 442 (FIG. 5) in conjunction with the circuitry shown in FIG. 6.

A resistor 192 connects the feedback signal FB of the converter 150 with the output of OP AMP 188. A resistor 194 is used to connect the regulated output voltage VCCP to the feedback input of the converter 150.

Figure 6:
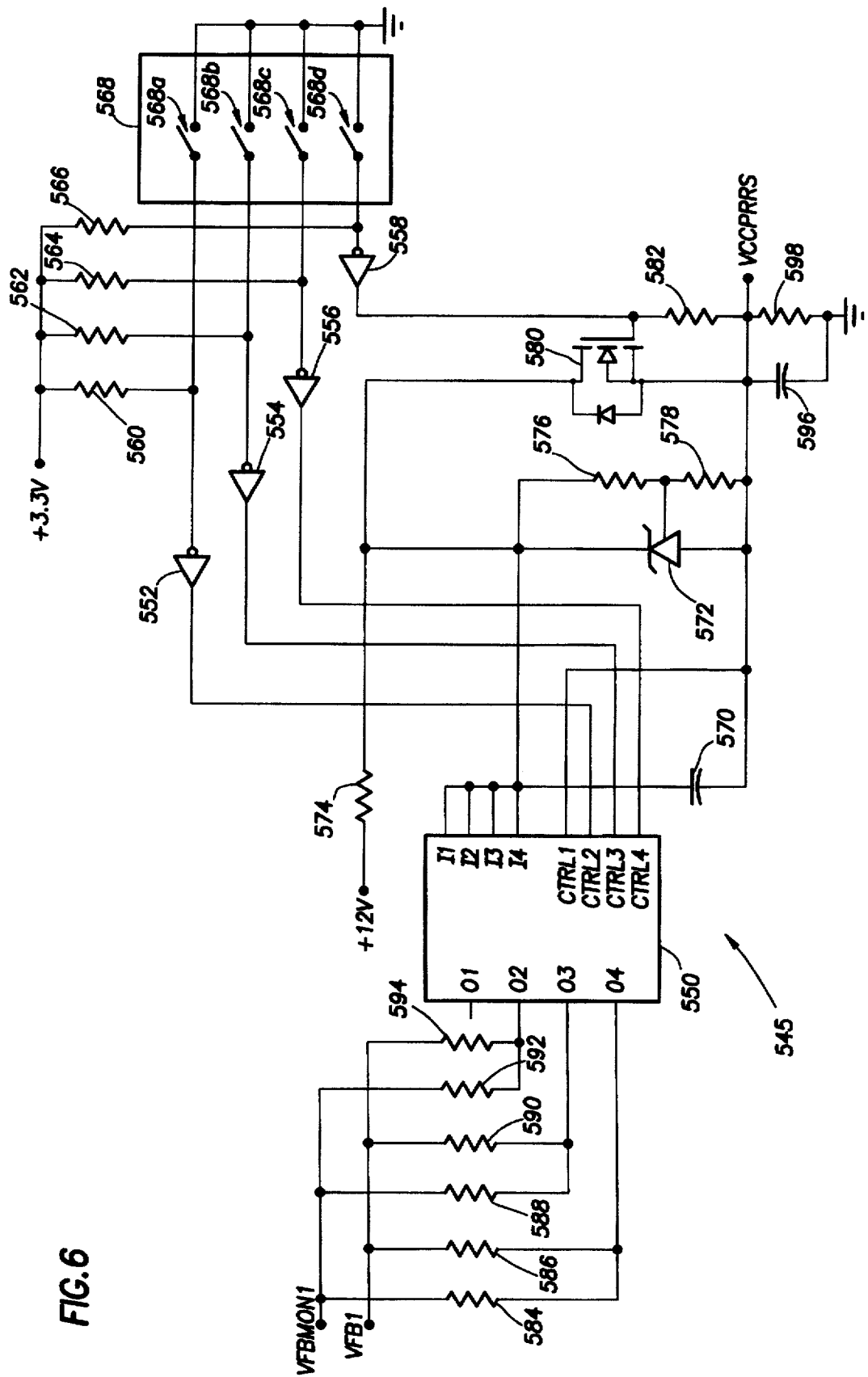
FIG. 6 is a schematic diagram of additional circuitry used to adjust the voltage fault thresholds of FIG. 5.

The voltage at the feedback input FB of the converter 150 is a function of the differential voltage between VREF1 and VFB1, which determines the amount of current flowing through the resistor 192. A capacitor 196 and a resistor 198 are used to couple the feedback signal FB to a low noise analog ground and feedback reference point VCCPRRS, which is bypassed to system ground through a capacitor 596 and a resistor 598 (FIG. 6).

A capacitor 202 and a resistor 204 connected in series serve as feedback compensation between the inverting input of the OP AMP 188 and its output. Further compensation can be accomplished by a second feedback capacitor 206 connected between the inverting input and the output of the OP AMP 188.

A bi-polar junction transistor (BJT) 200 is connected at its base to a common node between the soft-start timing capacitor 184 and resistor 186. The emitter of the transistor 200 is connected to analog ground VCCPRRS, while the collector is connected to the inverting input of the OP AMP 188.

In the preferred mode of operation, the shutdown control inputs SHDN* to both DC—DC converters 150 and 152 are connected to +5V through a resistor 208. SHDN* is an active low input.

A bulk capacitor 214 and a decoupling capacitor 216 are connected in parallel between the +5V power supply and ground. Similarly, a bulk capacitor 266 and a bypass capacitor 268 are connected in parallel between the +12V supply derived from the main power supply 101 and ground. Another bypass capacitor 270 is connected between the +12V supply and ground. The impedance values of these bypass capacitors are chosen such that unwanted AC signals are effectively shunted to ground. Parasitic resistances and inductances on the power supply lines can cause unwanted ripple on the power supply. The use of these bypass capacitors effectively lowers the impedance of the supply locally and nulls out the effect of the parasitics.

Both DC—DC converters 150 and 152 are powered at the V+ voltage input by the +12V power supply signal derived from the main power supply 101. A bypass capacitor 212 is used to locally bypass the V+ input of the converter 150, and ideally should be placed as close to this chip as possible. A second bypass capacitor 278 is used to bypass the V+ voltage input of the converter 152 to ground, and should also be placed in close proximity to the chip.

II. CIRCUITRY FOR GENERATING VTT

VTT, as discussed above, is used to power GTL+ termination resistors. Converter 152 forms and provides voltage VTT at the output of a low pass filter 217.

The circuitry connected to the second converter 152 is like in function and structure to that described above in relation to the converter 150. Thus, a low pass output filter 217 to diminish output fluctuations in VTT includes an inductor 218 connected to the switching node connection LX of the converter 152. The inductor 218 functions in a like manner to inductor 154 of the low pass filter 153. A current sense resistor 222 is connected between the other side of the inductor 218 and an output capacitor 220, with the voltage output VTT begin derived from this common node. The second side of the filter capacitor 220 is connected to ground.

The support circuitry for the converter 152 also includes a high-side MOSFET 226, whose source is connected to the switching node connection LX. The gate of the MOSFET 226 is connected to the high-side gate-drive output DH of converter 152 through a low ohmage resistor 228. The drain of the MOSFET 226 is connected to the +12V supply. A low-side MOSFET 224, serving as a synchronous rectifier, has its drain connected to the switching node connection of the converter 152 and its source connected to ground. The gate of this MOSFET 224 is connected to the low-side gate-drive output DL of the converter 152 through a resistor 230. A capacitor 232 is connected between the switching node connection and high-side gate-drive output of the converter 152 as part of a flying capacitor boost circuit. The capacitor 232, in conjunction with a diode 234 connected between the boost capacitor connection BST of the converter 152 and the +5V power supply, provides a flying capacitor boost circuit for driving the gate of the high-side MOSFET 226.

Two bypass capacitors 236 and 238 are connected in parallel between the 5V internal regulator output VL and pulse-skipping mode input SKIP* inputs of the converter 152 and ground. A capacitor 240 is used to couple the reference voltage output REF of the converter 152 to a second low noise analog ground or feedback reference point VTTRRS.

A resistor 272 and a bypass capacitor 274 are connected in parallel between system ground and analog ground VTTRRS, and serve to isolate the two signals. A soft-start timing capacitor 242 is connected between the soft-start timing capacitor connection SS of the converter 152 and a resistor 246. The other side of resistor 246 is connected to analog ground VTTRRS.

Connected to the feedback pin FB of the converter 152 is an adjustable feedback circuit 247 used to adjust the supply voltage VTT between about 1.2 volts and 1.8 volts. The adjustable feedback circuit 247 includes a low power OP AMP 248 which receives a reference voltage VREF2 at an inverting input of the OP AMP 248 through a resistor 250. The non-inverting input of OP AMP 248 is connected to an adjustable voltage VFB2. The voltage level of VREF2 is established by a shunt voltage reference 340 (FIG. 3) and is approximately 1.25 volts. The voltage level of the VFB2 is set by a voltage fault threshold adjustment network 298 (FIG. 3) in conjunction with the circuitry shown in FIG. 4.

A resistor 252 connects the feedback signal FB of the converter 152 with the output of the OP AMP 248. The regulated output voltage VTT of the converter 152 is connected to the feedback pin through a second resistor 254. A capacitor 256 is connected between the feedback pin of the converter 152 and the analog ground VTTRRS.

The adjustable feedback circuit 247 of the converter 152 includes a transistor 258, whose base is connected to the common node formed between the capacitor 242 and the resistor 246. The collector of the transistor 258 is connected to the inverting input of the OP AMP 248, while the emitter is connected to analog ground VTTRRS. The OP AMP 248 is compensated with a capacitor 260 connected at its inverting input in series with a resistor 262 connected to the output. A second compensation capacitor 264 is also connected between the inverting input of the OP AMP 248 and its output.

In the preferred embodiment, the output voltage VTT is used to power all GTL+ termination resistors and does not go directly to the CPU 100. The VTT signal can be varied between 1.2 volts and 1.8 volts by adjusting the VFB2 input to the feedback OP AMP 248. The level of VTT can thereby be set at a voltage that compensates for particularities in the fabrication process used to manufacture CPU 100.

III. CIRCUITRY FOR GENERATING VREF

VREF, as set forth above, is provided directly to the CPU 100 and is used to set up the reference voltage pins for the GTL+ buffers. VREF is generated by a circuit 281, including a resistor divider between VTT and the analog ground VTTRRS formed by two resistors 282 and 284 in conjunction with an OP AMP 280 configured as a unity gain buffer.

The non-inverting input of OP AMP 280 is connected to the common node of resistors 282 and 284, while its inverting input is connected directly to its output. The resistor values of the two resistors 282 and 284 are chosen to have a ratio such that the voltage seen at the non-inverting input of the OP AMP 280 is about ⅔ VTT.

A capacitor 288 is also connected between the non-inverting input of the OP AMP 280 and analog ground, and serves to stabilize the voltage seen at the input of the OP AMP 280. A second capacitor 286 is connected between the output of the OP AMP 280 and analog ground and serves to stabilize the VREF output voltage.

IV. VOLTAGE FAULT DETECTION CIRCUITRY FOR VTT

Figure 3:
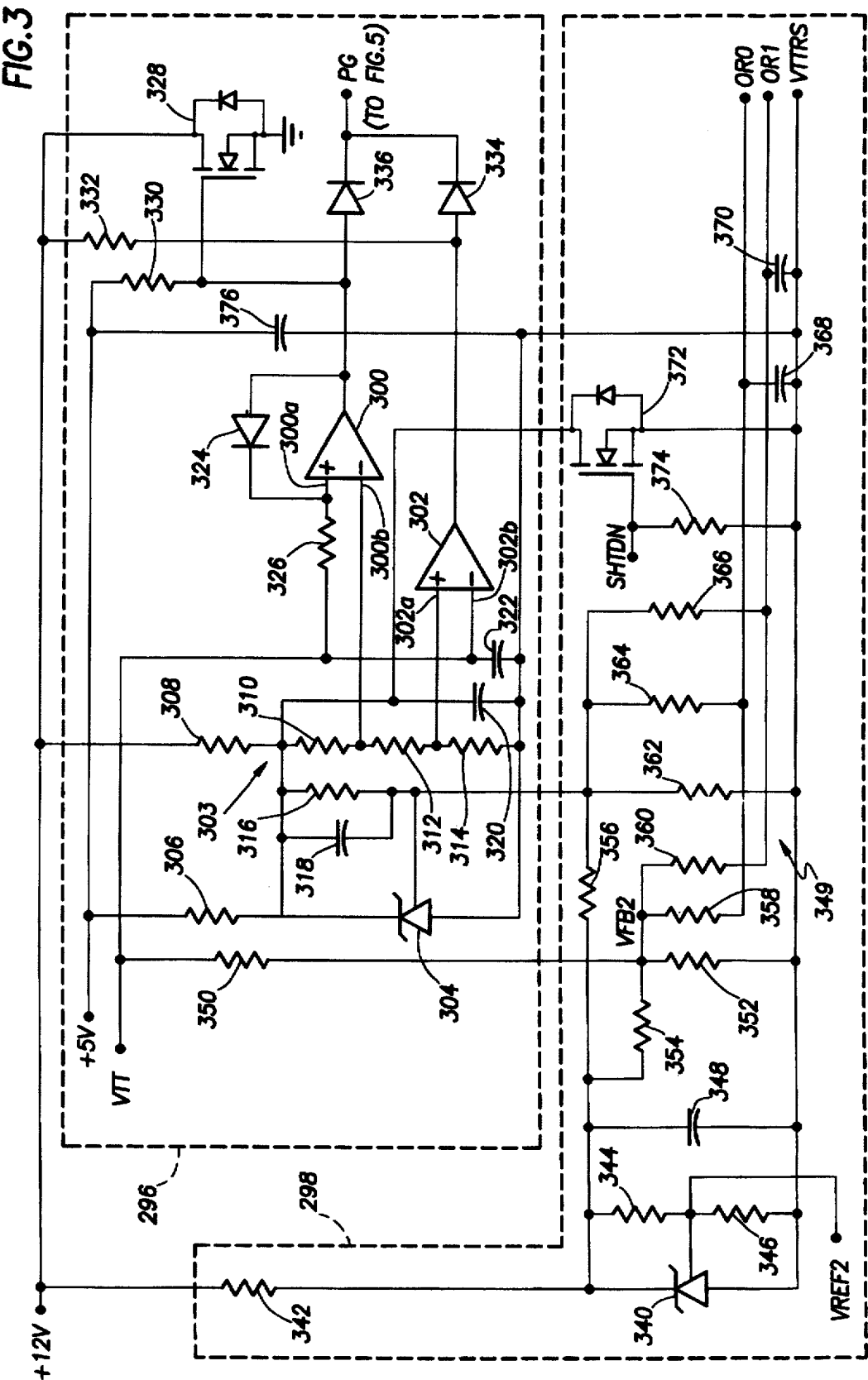
FIG. 3 is a schematic diagram of a portion of the voltage fault detection circuitry for detecting faults in a first signal generated by the DC—DC converter ICs of FIG. 2, including circuitry for varying voltage fault thresholds.

Referring now to FIG. 3, a voltage fault detection circuit 296 for detecting faults in VTT and a voltage fault threshold adjustment circuit 298 are shown. The voltage fault detection circuit 296 detects faults in the VTT signal generated by the DC—DC converter 150 (FIG. 2), and includes two window comparators 300 and 302. In the preferred embodiment, the window comparators 300 and 302 are LM393 low-power low-offset voltage comparators by National Semiconductor.

The non-inverting input 300a of the first comparator 300 is connected to the VTT output of the DC—C converter 150 through a resistor 326. The inverting input 302b of the second comparator 302 is connected directly to VTT. Each of these comparator inputs is also coupled to the analog ground VTTRRS through a capacitor 322.

The voltages seen at the inverting input 300b of the comparator 300 and the non-inverting input 302a of the comparator 302 are determined by a resistor divider network 303 between +12V and analog ground VTTRRS. The voltage divider network 303 includes a resistor 308 connected to +12V on one side and to a second resistor 310 on the other. A third resistor 312 is in series with the second resistor 310, and is connected to analog ground VTTRRS through a fourth resistor 314. The inverting input 300b to the first comparator 300 is connected to the common node between the resistors 310 and 312 of network 303, while the non-inverting input 302a to the second comparator 302 is connected to the common node between resistors 312 and 314 of network 303.

The output of the first window comparator 300 is driven high when the voltage seen at the common node between the resistors 310 and 312 is below VTT. Conversely, the output of the second window comparator 302 is driven high when the signal VTT is below the voltage seen at the common node between the resistors 312 and 314. Resistor 312 thus provides a voltage drop defining a range or "window" of acceptable voltage levels for VTT.

Figure 5:
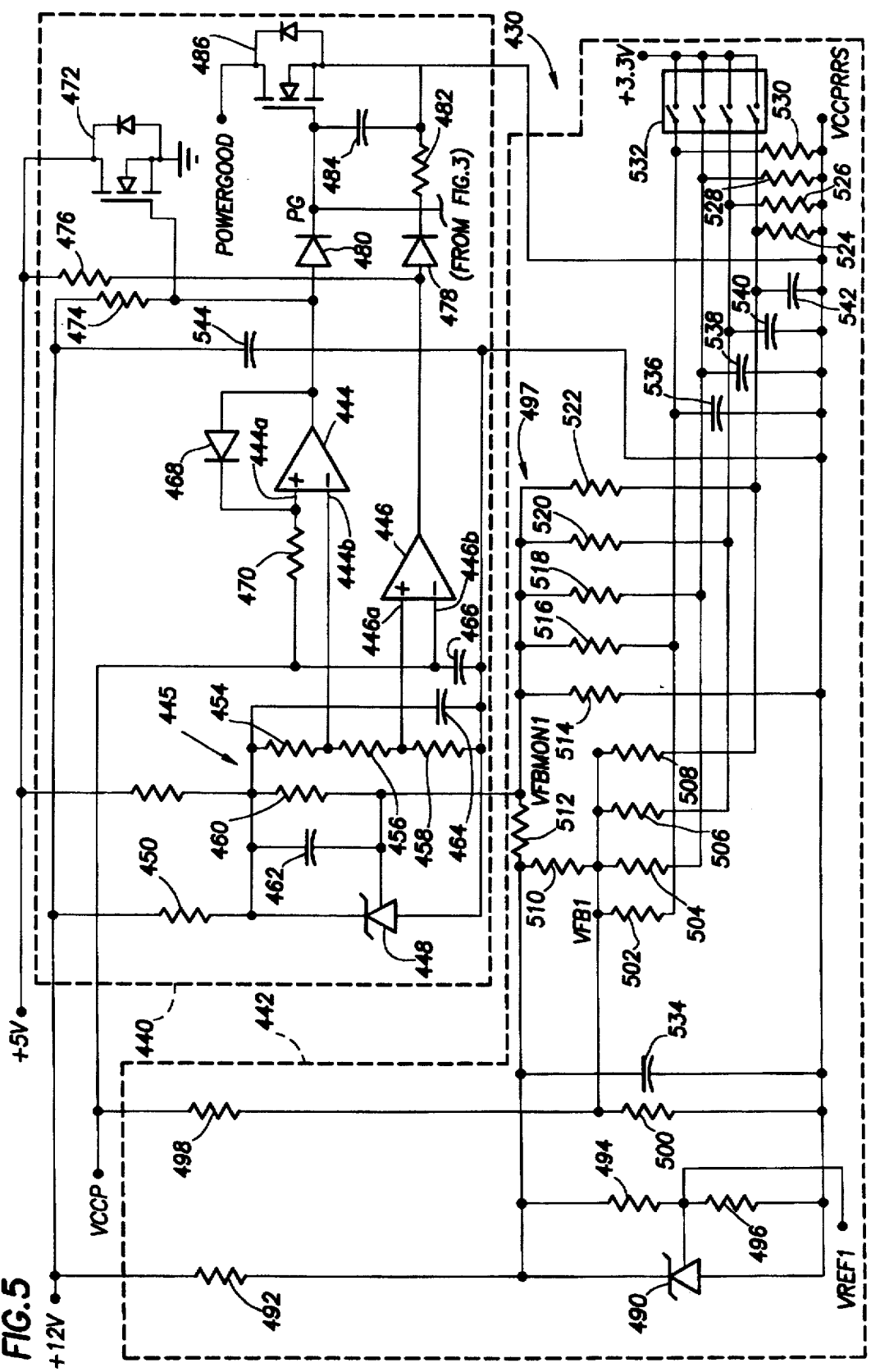
FIG. 5 is a schematic diagram of a second portion of the voltage fault detection circuitry for detecting faults in a second signal generated by the DC—DC converter ICs of FIG. 2, including circuitry for varying voltage fault thresholds.

The output of the window comparator 300 connects through a first diode 336 to a terminal providing a signal PG. A second diode 334 is connected to the output of the second comparator 302 and is also connected to the terminal providing the signal PG. Hence, whenever the voltage VTT is outside of the acceptable range of voltages set the voltage drop across resistor 312, the output of one of the comparators 300 or 302 is high. The diode 334 or 336 at the output which is in this state conducts, bringing the signal PG to a high voltage level. In the preferred embodiment, the signal PG is developed in conjunction with the window comparators 444 and 446 of FIG. 5, and is used to set a signal PWRGOOD (FIG. 5). PWRGOOD is available for use by board-level digital circuitry, if desired, and provides an indication of the status of the power supply voltages being supplied to the CPU 100.

The voltage fault detection comparator block 296 also includes an adjustable shunt voltage reference 304, which is used to set the bias voltage at the common node between the resistors 308 and 310. The anode of the shunt voltage reference is connected to the analog ground VTTRRS, while its cathode (output terminal) is connected to the +5V supply through a series resistor 306, which determines the current that flows through the shunt voltage reference 304. An external voltage stabilizing capacitor 318 is connected between the output terminal and the reference terminal of the shunt voltage reference 304. A feedback resistor 316 is also connected between the cathode or output terminal and the reference terminal of the shunt voltage reference 304. In addition, a stabilizing capacitor 320 is connected between the output terminal of the shunt voltage reference 304 and analog ground VTTRRS.

The function of the voltage reference 304 is to provide an adjustable reference voltage—at its output terminal—that determines the current flowing through the resistors 310, 312, and 314. The output voltage of the shunt voltage reference 304 is a function of an internal reference voltage and the ratio of the resistance of an external feedback resistor 316 and the resistance, looking from the reference terminal of voltage reference 304 to analog ground VTTRRS, of the voltage fault threshold adjustment network 298. The voltage thresholds that the signal VTT is compared with are altered by varying the resistance of the voltage fault threshold adjustment network 298. The voltage output of the shunt voltage reference 304 is thereby altered, which in turn changes the voltage drop across the resistors 310, 312, and 314 of network 303.

A limiting diode 324 is connected between the output and the non-inverting input 300a of comparator 300. The limiting diode 324 provides positive feedback and strengthens a high signal at the output of the comparator 300. Current through the diode 324 is limited by the resistor 326. A pull-up resistor 330 is connected between the +5V supply and the output of the comparator 300. A second pull-up resistor 332 is connected between the output of the second window comparator 302 and the +12V supply. These two resistors 330 and 332 pull the inputs to the diodes 334 and 336 high should one of the comparator 300 or 302 outputs fail.

The output of the first voltage comparator 300 is also connected to the gate of a short-circuiting MOSFET 328. The source of the MOSFET 328 is connected to ground, while its drain is connected to the +12V supply. When the output of the first comparator 300 goes high, the short-circuiting MOSFET 328 is turned on, thereby shorting the +12V supply to ground and causing a fault to be detected in the conventional power supply circuitry. All power supplies to the microprocessor 100 then shut down in the conventional manner due to this fault. It is contemplated that supply voltages other than +12V could be utilized.

As mentioned above, the voltage fault threshold adjustment network 298 can be used to vary the bias voltage for the window comparator network. The voltage fault threshold adjustment network 298 is biased by its own shunt voltage reference 340 whose anode is connected to analog ground VTTRRS and whose cathode (output terminal) is connected to the +12V power supply via a resistor 342. The resistor 342 regulates the amount of current flowing through the shunt voltage reference 340. An external feedback resistor 344 is connected between the output terminal of the shunt voltage reference 340 and its reference terminal (VREF2). VREF2 is provided to the non-inverting input of OP AMP 248 (FIG. 2) as described above.

A second external feedback resistor 346 is connected between the reference terminal of the shunt voltage reference 340 and analog ground VTTRRS. In the preferred embodiment, the feedback resistors 344 and 346 are approximately equal in value, setting the output voltage of the shunt voltage reference 340 at approximately 2.5 volts and the reference terminal at approximately 1.25 volts. A stabilizing capacitor 348 is connected between the output terminal of the shunt voltage reference 340 and analog ground VTTRRS.

A resistor network 349 included within the voltage fault threshold adjustment network 298 is used to vary the voltage at the output terminal of the first voltage reference 304. The resistor network 349 includes resistors 350 and 352 which form a divider between the VTT signal and analog ground VTTRRS. A resistor 354 is connected between the common node VFB2 of the resistor divider pair 350 and 352 and the output terminal of the shunt voltage reference 340. A resistor 356 of network 349 is connected between the output terminal of the shunt voltage reference 340 and the reference terminal of the shunt voltage reference 304. A resistor 358 is connected between the common node VFB2 of the voltage divider formed by the resistors 350 and 352 on one side and a terminal adapted to receive a voltage level OR0, which is formed in the voltage fault threshold adjustment circuitry of FIG. 4, on the other. Similarly, a resistor 360 is connected between the common node VFB2 of the voltage divider and a terminal adapted for receiving the voltage level OR1, also provided by the circuitry of FIG. 4.

Resistor 362 of threshold adjustment network 298 is connected between the reference terminal of the shunt voltage reference 304 and analog ground VTTRRS. Two additional resistors 364 and 366 of network 298 are connected to the reference terminal of shunt voltage reference 304 at one side and to the terminals for voltage levels OR0 and OR1, respectively, on the other. The voltage level OR0 is coupled to analog ground VTTRRS through a capacitor 368, while the voltage level OR1 is coupled to analog ground VTTRRS through a capacitor 370. Thus, by varying the voltages OR0 and OR1, the voltage seen at the reference terminal of the shunt voltage reference 304 can be changed in order to adjust its output voltage and ultimately the voltage seen across the resistor 312 (the voltage "window").

The window comparator circuitry of FIG. 3 can be disabled by a shutdown MOSFET 372, whose drain is connected to the output of the shunt voltage reference 304. The source of the MOSFET 372 is connected to analog ground VTTRRS and its gate is connected to an active high power down signal SHTDN. It is contemplated that a signal SHTDN could, if desired, be formed by external system logic for disabling the fault detection circuitry of FIG. 3. A resistor 374 is connected between the gate of the MOSFET 372 and analog ground VTTRRS, such that the MOSFET 372 is turned off when the shutdown signal SHTDN is not present.

A bypass capacitor 376, connected between +5V and analog ground VTTRRS is included in the voltage fault threshold adjustment network 298, and serves to null out the effect of any circuit board parasitics.

V. VOLTAGE FAULT THRESHOLD ADJUSTMENT CIRCUITRY FOR VTT

Figure 4:
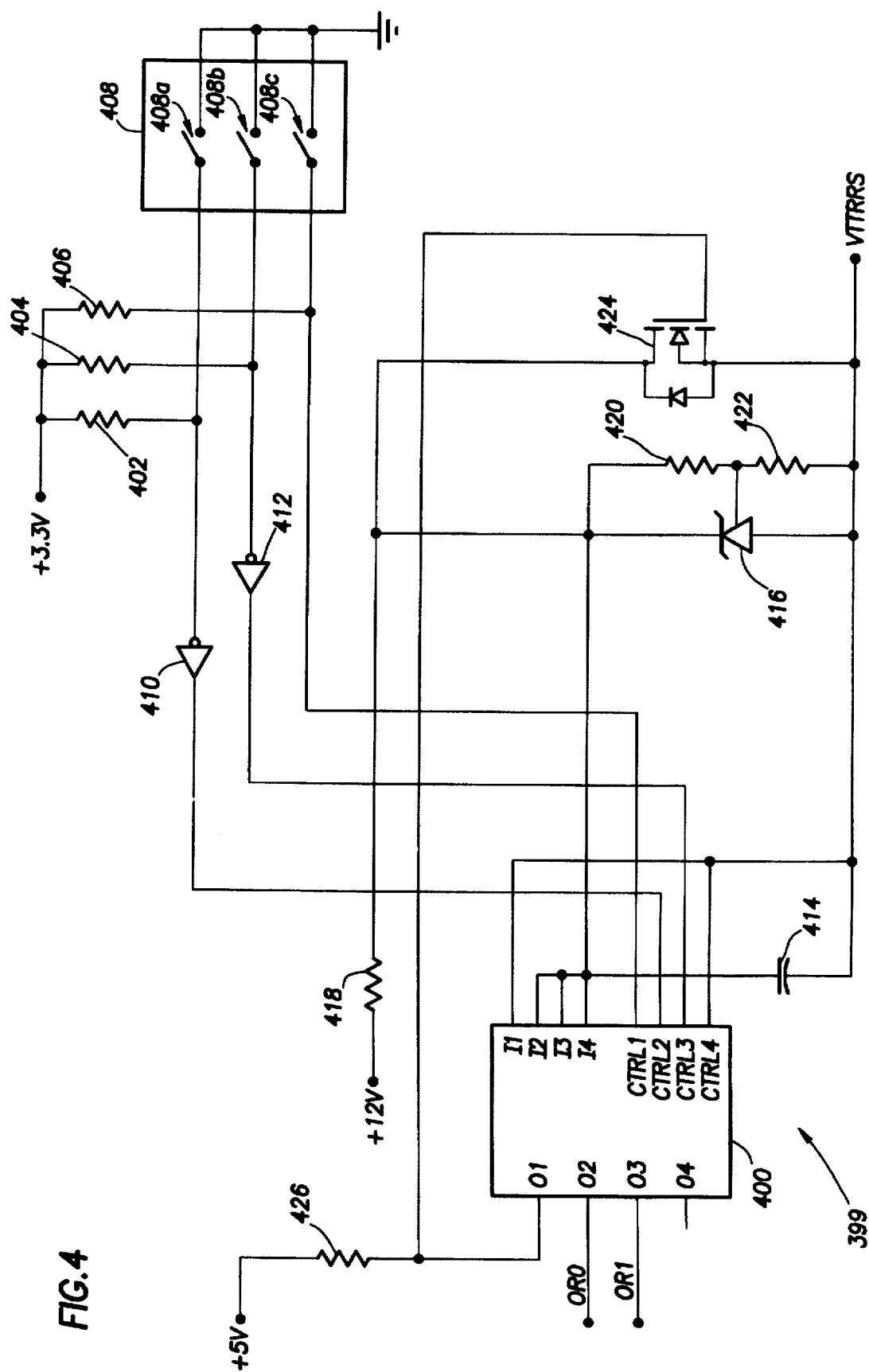
FIG. 4 is a schematic diagram of additional circuitry used to adjust the voltage fault thresholds generated by the circuitry of FIG. 3.

Referring now to FIG. 4, a circuit 399 is shown which forms the voltage levels OR0 and OR1 for adjusting the voltage fault thresholds at comparator inputs 300b and 302a of FIG. 3. The voltage levels seen on the voltage levels OR0 and OR1 are controlled by a quad bilateral switch 400. The quad bilateral switch 400 operates in a conventional manner: a logic high level at a control input CTRLx turns on a switch allowing an input Ix to pass through to a corresponding output pin Ox.

OR0 is provided at the 02 output of the quad bilateral switch 400 while OR1 is provided at the 03 output. A resistor 426 is connected between +5V power supply and the 01 output of the quad bilateral switch 400. Also connected to the 01 output is the gate of a MOSFET 424. The source of this MOSFET 424 is tied to analog ground VTTRRS, while its drain is tied to the 12V power supply via a resistor 418.

The I2, I3, and I4 inputs of the quad bilateral switch 400 are coupled to analog ground VTTRRS through a capacitor 414. The I1 and CTRL4 inputs of the quad bilateral switch 400 are both connected directly to analog ground VTTRRS. The I4 input is also connected to the output terminal of a shunt voltage reference 416.

The output terminal of shunt voltage reference 416 is also connected to the +12V power supply through the resistor 418, which establishes the current through the shunt voltage reference 416. The anode of the shunt voltage reference 416 is tied directly to analog ground VTTRRS. An external series feedback resistor 420 is connected between the output and the reference terminals of the voltage regulator 416. A second external series feedback resistor 422 connects the reference terminal to analog ground VTTRRS.

The CTRL2 input of the quad bilateral switch 400 is connected to the output of an inverting buffer 410, whose input is connected to the +3.3V supply through a pull-up resistor 402. The CTRL3 input of the quad bilateral switch 400 is connected to the output of a second inverting buffer 412 whose input is also connected to the +3.3V supply through a pull-up resistor 404. The CTRL1 input of the quad bilateral switch 400 is connected to the +3.3V supply through a pull-up resistor 406. In the preferred embodiment, the inputs to the inverting buffers 410 and 412, as well as the CTRL1 input of the quad bilateral switch 400 can individually be switched to ground through of a bank of dip switches 408.

A high voltage level at any of the control inputs to the quad bilateral switch 400 allows the corresponding input voltage to be seen at the corresponding output pin of switch 400. For example, if the signal CTRL1 pin is pulled high, as it is in the preferred embodiment through pull-up resistor 406 (and because dip switch 408c is open), the 01 output is pulled to analog ground VTTRRS due to the fact that the I1 pin is tied to analog ground. This in turn pulls the gate of the MOSFET 424 low, shutting it off. When the MOSFET 424 is turned on, the output voltage of the shunt voltage reference 416 is pulled to ground as are the I2, I3, and I4 inputs to the quad bilateral switch 400. In the preferred embodiment, however, the shunt voltage reference 416 sets up a voltage of approximately 2.5 volts at these inputs. Under normal conditions, the output of the shunt voltage reference 416 is not passed through to the O2 and O3 outputs of the quad bilateral switch 400. This is due to the CTRL2 and CTRL3 inputs of the quad bilateral switch 400 being pulled low by the inverting buffers 410 and 412.

The second and third switches of the quad bilateral switch 400 can be turned on closing the appropriate dip switches 408a and 408b in the dip switch bank 408. In this manner, OR0 and OR1 can be changed from a tri-stated floating condition to a voltage level corresponding to the output of the shunt voltage reference 416. This in turn alters the resistance of the voltage fault threshold adjustment network 298 and changes the voltage at the reference terminal of the shunt voltage reference 304 of FIG. 3. The voltage fault thresholds for the VTT signal can thereby be programmed by the dip switch bank 408. It is contemplated that other circuitry functionally equivalent to that of FIG. 4 could be used to control the voltage fault thresholds of FIG. 3.

VI. VOLTAGE FAULT DETECTION CIRCUITRY FOR VCCP

Referring now to FIG. 5, a voltage fault detection circuit 430 for detecting faults in the VCCP signal generated by the converter 152 of FIG. 2 is shown. The detection circuit 430 of FIG. 5 includes a voltage fault detection circuit 440 and a voltage fault threshold adjustment network 442. Fault detection circuit 440 operates in a similar fashion to the fault detection circuit 298 of FIG. 3, and includes two window comparators 444 and 446. Like the comparators 300 and 302 of FIG. 3, the window comparators 444 and 446 are LM393 low-power low-offset voltage comparators by National Semiconductor in the preferred embodiment.

The non-inverting input 444a of the first comparator 444 is connected to the VCCP output of the DC—DC converter 152 (FIG. 2) through a resistor 470. The inverting input 446b of the second comparator 446 is connected directly VCCP. Each of these comparator inputs 444a and 446b are coupled to the analog ground VCCPRRS through a capacitor 466.

The voltages seen at the inverting input 444b of the comparator 444 and the non-inverting input 446a of the comparator 446 are determined by a resistor divider network 445 between +5V and analog ground VCCPRRS. The resistor divider network 445 includes a resistor 452 connected to +5V on one side and to a second resistor 454 on the other. A third resistor 456 is in series with the second resistor 454, and is tied to analog ground VCCPRRS through a fourth resistor 458. The inverting input 444b to the first comparator 444 is connected to the common node between the resistors 454 and 456 of network 445, while the non-inverting input 446a of the second comparator 446 is connected to the common node between resistors 456 and 458 of network 445.

The output of the first window comparator 444 is driven high when the voltage seen at the common node between the resistors 454 and 456 is below VCCP. Conversely, the output of the second window comparator 446 is driven high when the signal VCCP is below the voltage seen at the common node between the resistors 456 and 458. Resistor 456 thus provides a voltage drop defining a range or "window" of acceptable voltage levels for VCCP.

The output of the window comparator 444 connects through a first diode 480 to the same signal line PG as that shown in FIG. 3. A second diode 478 is connected to the output of the second comparator 446 and is also connected to the signal line PG. The outputs of all four window comparators 300, 302, 444, and 446 are thus connected together through diodes 334, 336, 478, and 480 to the signal PG. Hence, whenever either of the voltages VTT or VCCP is outside of its predetermined voltage fault threshold window, one of the window comparator 300, 302, 444, or 446 outputs is high and the diode at the corresponding output conducts, bringing the signal line PG to a high voltage level.

The signal line PG drives the gate of an n-channel MOSFET 486. The source of this MOSFET 486 is connected to analog ground VCCPRRS, while its drain is connected to a signal line PWRGOOD. When PG is high, the MOSFET 486 turns on and PWRGOOD is driven low. As mentioned above, PWRGOOD is available, if needed, to board-level digital circuitry as an indication of the status of the power supply voltages being supplied to the CPU 100. The signal PWRGOOD is normally not driven low if both VCCP and VTT are within specification.

A resistor 482 connects the gate of the MOSFET 486 to analog ground VCCPRRS to assure that the MOSFET 486 is not conducting when none of the voltage comparator 300, 302, 444, or 446 outputs are high (i.e. none of the diodes are on). A capacitor 484 connected in parallel with the resistor 482 stabilizes the voltage at the gate of the MOSFET 486.

The voltage fault detection circuit 440 also includes an adjustable shunt voltage reference 448, which is used to set the bias voltage at the common node between the resistors 452 and 454 of network 445. The anode of the shunt voltage reference is connected to the analog ground VCCPRRS, while its output terminal is connected to the +12V supply through a series resistor 450, which determines the current that flows through the voltage reference 448. An external voltage stabilizing capacitor 462 is connected between the cathode or output terminal and the reference terminal of the voltage reference 448. A feedback resistor 460 is also connected between the output terminal and the reference terminal of the voltage reference 448. In addition, a stabilizing capacitor 464 is connected between the output terminal of the shunt voltage reference 448 and analog ground VCCPRRS.

The function of the voltage reference 448 is to provide an adjustable reference voltage—at its output terminal—that effectively determines the voltage thresholds with which the signal VCCP is compared. The voltage at the output terminal of the voltage reference 448 determines the current flowing through the resistors 454, 456, and 458. This output voltage is a function of an internal reference voltage and the ratio of the resistance of an external feedback resistor 460 and the resistance, looking from the reference terminal to analog ground VCCPRRS, of the voltage fault threshold adjustment network 442.

By varying the resistance of the voltage fault threshold network 442, the voltage output of the shunt voltage reference 448 is altered, which in turn changes the voltage drop across the resistor string formed by the resistors 454, 456, and 458 of network 445. The voltage thresholds that the signal VCCP is compared with are thereby altered.

A limiting diode 468 is connected between the output and the non-inverting input 444a of the first voltage comparator 444. The limiting diode 468 provides positive feedback and strengthens a high signal at the output of the comparator 444. Current through the diode 468 is limited by the resistor 470. A pull-up resistor 474 is connected between the +12V supply and the output of the comparator 444. A second pull-up resistor 476 is connected between the output of the second window comparator 446 and the +5V supply.

The output of the first voltage comparator 444 is also connected to the gate of a short-circuiting MOSFET 472. The source of the MOSFET 472 is connected to ground, while its drain is connected to the +5V supply. When the output of the first comparator 444 goes high, the short-circuiting MOSFET 472 is turned on, thereby shorting the +5V supply to ground and causing a fault to be detected in the conventional power supply circuitry. All power supplies to the CPU 100 then shut down in the conventional manner due to this fault. It is contemplated that supply voltages other than +5V could be shorted to ground in order to cause a fault internal to the power supply 101.

As mentioned above, the voltage fault threshold adjustment network 442 can be used to vary the bias voltage for the window comparator network. The voltage fault threshold adjustment network 442 is biased by its own shunt voltage reference 490 whose anode is connected to analog ground VCCPRRS and whose output terminal is connected to the +12V power supply via a resistor 492. The resistor 492 regulates the amount of current flowing through the shunt voltage reference 490. An external feedback resistor 494 is connected between the output of the shunt voltage reference 490 and its reference terminal. The voltage level VREF1 is provided to the inverting input of OP AMP 190 (FIG. 2) as described above.

A second external feedback resistor 496 is connected between the reference terminal of shunt voltage reference 490 and analog ground VCCPRRS. In the preferred embodiment, the feedback resistors 494 and 496 are approximately equal in value, setting the output voltage of the shunt voltage reference 490 at approximately 2.5 volts and the reference terminal (VREF1) at approximately 1.25 volts. A stabilizing capacitor 534 is connected between the output terminal of the shunt voltage reference 490 and analog ground VCCPRRS. Also included in the circuitry of FIG. 5 is a bypass capacitor 544, connected between +5V and analog ground VCCPRRS, which serves to null out the effect of any circuit board parasitics.

A resistor network 497 is included within the voltage fault threshold adjustment network 442 to vary the output voltage of the voltage reference 448. The resistor network 497 includes resistors 498 and 500 forming a divider between the VCCP signal and analog ground VCCPRRS. A resistor 510 is connected between the common node VFB1 of the resistor divider pair 498 and 500 and the output terminal of the voltage reference 490. A resistor 512 of network 497 is connected between the output terminal of the voltage reference 490 and the reference terminal of the voltage reference 448. Resistor 514 connects VFBMON1 to analog ground VCCPRRS.

A first pair of resistors 502 and 516 in network 497 is connected in series between VFB1 and VFBMON1. A second pair of resistors 504 and 518 is also connected in network 497 in series between VFB1 and VFBMON1. A third pair of resistors 506 and 520 and a fourth and final pair of resistors 508 and 522, each pair in network 497, are connected in series between VFB1 and VFBMON1.

A stabilizing capacitor 536 and a resistor 530 are connected in parallel between the common node of the first pair of resistors 502 and 516 of network 497 and analog ground VCCPRRS, while a stabilizing capacitor 538 and a resistor 528 are connected in parallel between the common node of the second pair of resistors 504 and 518 and analog ground VCCPRRS. Likewise, a stabilizing capacitor 540 and a resistor 526 are connected in parallel between the common node of the third pair of resistors 506 and 520 and analog ground VCCPRRS. Additionally, a stabilizing capacitor 542 and a resistor 524 are connected in parallel between the common node of the fourth pair of resistors 508 and 522 analog ground VCCPRRS.

The common node of each of the four resistor pairs in network 497—502 and 516, 504 and 518, 506 and 520, and 508 and 522, respectively—is connected individually to a particular one of a bank of dip switches 532. Each of these particular nodes can be individually switched to +3.3V by closing a corresponding switch in bank 532.

By closing different combinations of switches in the bank of dip switches 532 and choosing the appropriate resistor values in network 497, the voltage level VFBMON1 seen at the reference terminal of the shunt voltage reference 448 can be changed. The output voltage of reference 448 is thereby altered, as well as the voltage seen across the resistor 456 (the voltage "window" for VCCP).

VII. VOLTAGE FAULT THRESHOLD ADJUSTMENT CIRCUITRY FOR VCCP

Referring now to FIG. 6, a circuit 545 for further adjusting of the voltage fault thresholds (comparator inputs 444b and 446a) provided by the circuitry of FIG. 5 is shown. The voltage level VFBMON1 seen at the reference terminal of the shunt voltage reference 448 (FIG. 5) and the voltage level VFB1 are controlled in part by a quad bilateral switch 550. The operation of this quad bilateral switch 550 is like that of quad bilateral switch 400.

The voltage level VFBMON1 is provided by the O2 output of the quad bilateral switch 550 through a resistor 592, the O3 output through a second resistor 588, and the O4 output through a third resistor 584. The voltage level VFB1 is provided by the O2 output of the quad bilateral switch 550 through a resistor 594, the O3 output through a second resistor 590, and the O4 output through a third resistor 586.

All four inputs I1, I2, I3, and I4 to the quad bilateral switch 550 are connected to the output terminal of a voltage reference 572. The output terminal of reference 572 is also connected to +12V via a resistor 574, whose purpose is to regulate the current flowing through the voltage reference 572. The anode of the shunt voltage reference 572 is tied directly to analog ground VCCPRRS. An external series feedback resistor 576 connects the output terminal of the voltage reference 572 to its reference terminal. A second external series feedback resistor 578 connects the reference terminal to the analog ground VCCPRRS. A voltage stabilizing capacitor 570 is connected between the output terminal of the voltage reference 572 and analog ground VCCPRRS.

The drain of an n-channel MOSFET 580 is also connected to the output terminal of the shunt voltage reference 572. The source of the MOSFET 580 is connected to analog ground VCCPRRS, while its gate is connected to the output of an inverting buffer 558. A resistor 582 also connects the gate of the MOSFET 580 to analog ground VCCPRRS.

The CTRL2 input of the quad bilateral switch 550 is connected to the output of an inverting buffer 552. The input of the inverting buffer 552 is connected to the +3.3V supply through a pull-up resistor 560. The CTRL3 input of the quad bilateral switch 550 is connected to the output of a second inverting buffer 554, whose input is also connected to the +3.3V supply through a pull-up resistor 562.

The CTRL4 input of the quad bilateral switch 550 is connected to the output of a third inverting buffer 556. The input of this inverting buffer 556 is connected to the +3.3V supply through a third pull-up resistor 564. A fourth pull-up resistor 566 connects the input of inverting buffer 558 to the +3.3V supply. The CTRL1 input of the quad bilateral switch 550 is connected directly to the analog ground VCCPRRS. In the preferred embodiment, the inputs to the inverting buffers 552, 554, 556, and 558 are connected individually to a particular one of a bank of dip switches 568. Each input can be individually switched to ground by closing its corresponding switch.

A high voltage level at any of the control inputs to the quad bilateral switch 550 allows an input voltage to be seen at a corresponding output pin. For example, if the signal pin CTRL2 is pulled low, as it is in the preferred embodiment through pull-up resistor 560 and inverting buffer 552, the corresponding switch in quad bilateral switch 550 is turned off and the O2 output of the quad bilateral switch 550 does not affect the voltage level of VFBMON1 or VFB1. If the dip switch corresponding to the CTRL2 input is closed, however, CTRL2 goes high, a switch closes, and the voltage at the O2 output goes to a level approximately equal to the voltage at the I2 input (which is equal to the output terminal voltage of voltage reference 572). The voltages at the O3 and O4 outputs of quad bilateral switch 550 are controlled in a like manner.

In the preferred embodiment, the voltage reference 572 sets up a voltage of approximately 2.5 volts at the inputs I1, I2, I3, and I4 of the quad bilateral switch 550. However, the inputs are pulled to ground if the MOSFET 580 is turned on by closing dip switch 568d in the bank 568 corresponding to the inverting buffer 558. Closing switch 568d causes the gate of the MOSFET 580 to be pulled high. The MOSFET 580 is thereby turned on and the output of the voltage reference 572 is shorted to ground. A low signal is then seen at the output of any enabled switch in the quad bilateral switch 550.

By closing other switches 568a, 568b, and 568c in the bank of dip switches 568, then, the voltage level of VFBMON1 and VFB1 can be altered. This in turn alters the resistance of the voltage fault threshold adjustment network 442 of FIG. 5, and changes the voltage at the reference terminal of the voltage reference 448. The voltage fault thresholds for the VCCP signal are thereby programmed and adjusted by the dip switch bank 568. It is contemplated that other circuitry functionally equivalent to that of FIG. 6 could be used to alter the voltage fault thresholds of FIG. 5.

Thus, it can be seen that the present invention provides voltage fault detection for the secondary voltage regulator module 102 in a multiple-supply computer system. In the event that one of the secondary voltage signals exceeds an adjustable predetermined threshold voltage, window comparator circuitry (FIGS. 3 and 5) produces a fault signal. The fault signal so formed activates an electronic switch or MOSFET 328 or 472 connected between one of the outputs of the main power supply and ground.

Fault detection circuitry internal to the main power supply 101 is activated whenever one of the main power supply outputs is shorted to ground. This in turn causes the main power supply 101 to shut down, thereby removing all power supply voltages to the microprocessor 100. In this manner, the microprocessor 100 is protected from potentially destructive latch-up conditions.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the scope and spirit of the invention.

What is claimed is:

1. A circuit for monitoring and disabling power supply signals to a microprocessor used in a computer system which includes a main power supply providing at least one primary supply voltage signal and a DC—DC converter circuit which provides at least one secondary supply voltage signal to the microprocessor, the circuit comprising:

comparator means for sensing and comparing the secondary supply voltage signal with a reference voltage level, said comparator means for sensing providing a fault signal indicating by a first fault signal level that said secondary supply voltage signal is within a predetermined range of satisfactory power supply voltage values, and indicating by a second fault signal level that said secondary supply voltage signal is outside said predetermined range of satisfactory power supply voltage values; and an electronic switch connected to receive said fault signal, said electronic switch being connected between a primary supply voltage line and ground, said switch being non-conductive when said fault signal is at said first fault signal level, said switch effectively coupling said primary supply voltage signal line to ground when said fault signal is at said second fault signal level.

2. The circuit of claim 1, wherein said comparator means includes window comparator circuit for detecting fault conditions.

3. The circuit of claim 2, wherein said comparator means includes means for adjusting said predetermined range of voltage values.

4. The circuit of claim 2, wherein said predetermined range of satisfactory power supply voltage values is from about 2.1 volts to about 3.5 volts.

5. The circuit of claim 2, wherein said predetermined range of satisfactory power supply voltage values is from about 1.2 volts to about 1.8 volts.

6. The circuit of claim 1, further comprising:

a resistor having a first end and a second end, said first end connected to a primary supply voltage line; and a transistor having a gate connected to said second end of said resistor, a source connected to ground, and a drain connected to a primary supply voltage line, said gate further connected to a ground plane internal to said DC—DC converter circuit, such that said transistor is turned off while said DC—DC converter circuit is present within said computer system, otherwise said gate is pulled high and said transistor turns on, thereby shorting said primary supply voltage to ground and causing a fault to be detected by said main power supply.

7. A computer system, comprising:

a main power supply providing at least one primary supply voltage signal;

a DC—DC converter circuit receiving at least one of said primary supply voltage signal(s) and providing at least one secondary supply voltage signal to a microprocessor;

comparator means for sensing and comparing the secondary supply voltage signal with a reference voltage level, said comparator means for sensing providing a fault signal indicating by a first fault signal level that said secondary supply voltage signal is within a predetermined range of satisfactory power supply voltage values, and indicating by a second fault signal level that said secondary supply voltage signal is outside said predetermined range of satisfactory power supply voltage values; and an electronic switch connected to receive said fault signal, said electronic switch being connected between a primary supply voltage line and ground, said switch being non-conductive when said fault signal is at said first fault signal level, said switch effectively coupling said primary supply voltage line to ground when said fault signal is at said second fault signal level.

8. The computer system of claim 7, wherein said comparator means includes a window comparator circuit for detecting fault conditions.

9. The computer system of claim 8, wherein said comparator means includes means for adjusting said predetermined range of voltage values.

10. The computer system of claim 8, wherein said predetermined range of voltage values is from about 2.1 volts to about 3.5 volts.

11. The computer system of claim 8, wherein said predetermined range of voltage values is from about 1.2 volts to about 1.8 volts.

12. The computer system of claim 7, further comprising:

a resistor having a first end and a second end, said first end connected to a primary supply voltage line; and a transistor having a gate connected to said second end of said resistor, a source connected to ground, and a drain connected to a primary supply voltage line, said gate further connected to a ground plane internal to said DC—DC converter circuit, such that said transistor is turned off while said DC—DC converter circuit is present within said computer system, otherwise said gate is pulled high and said transistor turns on, thereby shorting said primary supply voltage line to ground and causing a fault to be detected by said main power supply.

13. A circuit for monitoring and disabling power supply signals to a microprocessor used in a computer system which includes a main power supply providing primary supply voltages and a DC—DC converter circuit which provides secondary supply voltages for use by the microprocessor, the circuit comprising:

comparator means responsive to a first secondary supply voltage for providing a first fault signal line;

comparator means responsive to a second secondary supply voltage for providing a second fault signal line;

a first transistor having a gate connected to said first fault signal line, a drain connected to one of said primary supply voltages, and a source connected to ground; and a second transistor having a gate connected to said second fault signal line, a drain connected to one of said primary supply voltages, and a source connected to ground.

14. The circuit of claim 13, wherein:

said comparator means responsive to said first secondary supply voltage includes a first window comparator circuit for driving said first fault signal line such that said first transistor is conducting when said first secondary supply voltage is outside a first predetermined voltage range; and wherein said comparator means responsive to said second secondary supply voltage includes a second window comparator circuit for driving said second fault signal line such that said second transistor is conducting when said second secondary supply voltage is outside a second predetermined voltage range.

15. The circuit of claim 14, wherein said first window comparator circuit further includes means for adjusting said first predetermined voltage range and wherein said second window comparator circuit further includes means for adjusting said second predetermined voltage range.

16. The circuit of claim 14, wherein:

said first predetermined voltage range is from about 2.1 volts to about 3.5 volts; and wherein said second predetermined voltage range is from about 1.2 volts to about 1.8 volts.

17. The circuit of claim 15, further including means for summing said first and second fault signals.

18. The circuit of claim 17, further including:

a resistor having a first end and a second end, said first end connected to one of said primary supply voltages; and a transistor having a gate connected to said second end of said resistor, a source connected to ground, and a drain connected to one of said primary supply voltages, said gate further connected to a ground plane internal to the DC—DC converter circuit, such that said transistor is turned off while said DC—DC converter circuit is present within said computer system, otherwise said gate is pulled high and said transistor conducts, thereby effectively shorting said primary supply voltage to ground and causing a fault to be detected by said main power supply.

19. A circuit for monitoring and disabling power supply signals to a microprocessor used in a computer system which includes a main power supply providing at least one primary supply voltage signal and a DC—DC converter circuit which provides at least one secondary supply voltage signal to the microprocessor, the circuit comprising:

a comparator circuit configured to compare the secondary supply voltage signal with at least one voltage fault threshold level, said comparator circuit providing a fault signal indicating by a first fault signal level that said secondary supply voltage signal is within a predetermined range of satisfactory power supply voltage values, and indicating by a second fault signal level that said secondary supply voltage signal is outside said predetermined range of satisfactory power supply voltage values; and an electronic switch connected to receive and respond to said fault signal, said electronic switch being connected between a primary supply voltage line and ground, said switch being non-conductive when said fault signal is at said first fault signal level, said switch effectively coupling said primary supply voltage signal line to ground when said fault signal is at said second fault signal level.

20. The circuit of claim 19, wherein said comparator circuit is configured as a window comparator for comparing the secondary supply voltage signal with two voltage fault threshold levels.

21. The circuit of claim 20, further comprising a voltage fault threshold adjustment circuit for adjusting at least one of the voltage fault threshold levels.

22. A computer system, comprising:

a main power supply providing at least one primary supply voltage signal;

a DC—DC converter circuit receiving at least one of said primary supply voltage signal(s) and providing at least one secondary supply voltage signal to a microprocessor;

a comparator circuit configured to compare the secondary supply voltage signal with at least one voltage fault threshold level, said comparator circuit providing a fault signal indicating by a first fault signal level that said secondary supply voltage signal is within a predetermined range of satisfactory power supply voltage values, and indicating by a second fault signal level that said secondary supply voltage signal is outside said predetermined range of satisfactory power supply voltage values; and an electronic switch connected to receive said fault signal, said electronic switch being connected between a primary supply voltage line and ground, said switch being non-conductive when said fault signal is at said first fault signal level, said switch effectively coupling said primary supply voltage line to ground when said fault signal is at said second fault signal level.

23. The computer system of claim 22, wherein said comparator circuit is configured as a window comparator for comparing the secondary supply voltage signal with two voltage fault threshold levels.

24. The computer system of claim 23, further comprising a voltage fault threshold adjustment circuit for adjusting at least one of the voltage fault threshold levels.

* * * * *